(12) United States Patent
Koike

(10) Patent No.: US 11,379,623 B2
(45) Date of Patent: Jul. 5, 2022

(54) INFORMATION PROCESSING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventor: Hiroaki Koike, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 15/986,035

(22) Filed: May 22, 2018

(65) Prior Publication Data

US 2018/0341790 A1 Nov. 29, 2018

(30) Foreign Application Priority Data

May 26, 2017 (JP) .............................. JP2017-104944

(51) Int. Cl.
*G06F 21/84* (2013.01)
*H04L 9/40* (2022.01)
*G06F 21/31* (2013.01)

(52) U.S. Cl.
CPC .............. *G06F 21/84* (2013.01); *G06F 21/31* (2013.01); *H04L 63/083* (2013.01)

(58) Field of Classification Search
CPC ....... G06F 21/84; G06F 21/31; H04L 63/083; H04N 1/00514; H04N 1/4433
See application file for complete search history.

(56) References Cited

U.S. PATENT DOCUMENTS

| | | | | |
|---|---|---|---|---|
| 6,760,748 B1 * | 7/2004 | Hakim | .................... | G09B 5/14 434/350 |
| 7,673,045 B1 * | 3/2010 | Battle | .................... | G06F 21/41 709/225 |
| 7,703,133 B1 * | 4/2010 | Balasubramanian | ........................ | G06F 3/0481 713/164 |
| 7,788,723 B2 * | 8/2010 | Huddleston | ........... | G06F 21/554 726/24 |
| 7,809,297 B2 * | 10/2010 | Moroi | ................ | H04N 1/00965 399/80 |
| 8,773,681 B2 * | 7/2014 | Kamasuka | ............ | G06F 3/1239 358/1.14 |
| 9,513,927 B1 * | 12/2016 | Sivertsen | .............. | G06F 9/4401 |
| 9,639,242 B2 | 5/2017 | Sato | | |
| 9,672,386 B2 * | 6/2017 | Takemura | ............... | G06F 21/79 |
| 11,076,010 B2 * | 7/2021 | Asai | .................... | H04L 63/0876 |
| 2003/0078965 A1 * | 4/2003 | Cocotis | .................. | H04L 67/02 709/203 |
| 2004/0083357 A1 * | 4/2004 | Duncan | ................ | G06F 9/4406 713/2 |

(Continued)

FOREIGN PATENT DOCUMENTS

JP 2016110511 A 6/2016

*Primary Examiner* — Michael Pyzocha
(74) *Attorney, Agent, or Firm* — Rossi, Kimms & McDowell LLP

(57) ABSTRACT

Upon accepting a start-up request or logout request of a login application, an information processing apparatus according to this embodiment controls to display a blank screen that does not input to a display unit or ignore input via a UI screen displayed on the display unit before the login application is started up or logout processing is completed.

15 Claims, 12 Drawing Sheets

(56) References Cited

U.S. PATENT DOCUMENTS

| | | | |
|---|---|---|---|
| 2004/0117358 A1* | 6/2004 | von Kaenel | G06Q 40/08 |
| 2004/0258429 A1* | 12/2004 | Moroi | H04N 1/00244 399/80 |
| 2005/0231760 A1* | 10/2005 | Minato | H04N 1/00416 358/1.15 |
| 2006/0005034 A1* | 1/2006 | Willman | G06F 21/575 713/182 |
| 2006/0198653 A1* | 9/2006 | Plewnia | G03G 21/02 399/79 |
| 2006/0214910 A1* | 9/2006 | Mizuno | G06F 1/162 345/156 |
| 2007/0140557 A1* | 6/2007 | Osada | G06F 21/608 382/167 |
| 2008/0239357 A1* | 10/2008 | Matsushima | G06F 21/34 358/1.13 |
| 2009/0240924 A1* | 9/2009 | Yasaki | G06F 9/45558 712/220 |
| 2009/0276847 A1* | 11/2009 | Kotaka | G06F 21/608 726/17 |
| 2010/0071059 A1* | 3/2010 | Urasawa | G06F 21/31 726/19 |
| 2011/0029878 A1* | 2/2011 | Matsumoto | H04N 1/32117 715/733 |
| 2011/0176169 A1* | 7/2011 | Kashioka | H04N 1/0048 358/1.15 |
| 2011/0235087 A1* | 9/2011 | Muzitani | H04N 1/0049 358/1.14 |
| 2011/0317218 A1* | 12/2011 | Zhang | H04L 67/26 358/1.15 |
| 2011/0320925 A1* | 12/2011 | Piersol | G06Q 10/06 715/231 |
| 2012/0054855 A1* | 3/2012 | Shimizu | G06F 21/608 726/19 |
| 2012/0224203 A1* | 9/2012 | Masuda | G03G 15/502 358/1.13 |
| 2012/0272299 A1* | 10/2012 | Ikeuchi | G06F 21/608 726/5 |
| 2013/0007472 A1* | 1/2013 | Yamada | G06F 12/1408 713/193 |
| 2013/0050736 A1* | 2/2013 | Akahira | H04N 1/4413 358/1.14 |
| 2013/0070282 A1* | 3/2013 | Takahashi | G06F 3/1285 358/1.14 |
| 2013/0171971 A1* | 7/2013 | Fujii | H04W 12/0608 455/411 |
| 2014/0029041 A1* | 1/2014 | Okubo | H04N 1/4433 358/1.14 |
| 2014/0068456 A1* | 3/2014 | Chan | G06F 21/31 715/747 |
| 2014/0096232 A1* | 4/2014 | Tanabe | G06F 21/31 726/16 |
| 2014/0189596 A1* | 7/2014 | Taniuchi | G06F 3/0482 715/835 |
| 2014/0211240 A1* | 7/2014 | Maki | G06F 21/629 358/1.14 |
| 2014/0245413 A1* | 8/2014 | Yasui | H04L 63/10 726/7 |
| 2015/0261481 A1* | 9/2015 | Takenaka | H04N 1/0035 358/1.15 |
| 2016/0005062 A1* | 1/2016 | Sonpal | G06Q 30/02 705/7.34 |
| 2016/0057298 A1* | 2/2016 | Sasase | H04N 1/00392 358/1.15 |
| 2016/0092146 A1* | 3/2016 | Adachi | G06F 3/1239 358/1.14 |
| 2017/0013170 A1* | 1/2017 | Sato | H04N 1/00413 |
| 2017/0085731 A1* | 3/2017 | Akuzawa | H04N 1/00411 |
| 2017/0091407 A1* | 3/2017 | Gonzalez | G16H 40/20 |
| 2017/0094121 A1* | 3/2017 | Mizuno | G06F 3/0482 |
| 2017/0127278 A1* | 5/2017 | Yamamoto | H04W 12/06 |
| 2017/0139658 A1* | 5/2017 | Nagata | G03G 15/5016 |
| 2017/0161474 A1* | 6/2017 | Giatilis | G06F 21/31 |
| 2017/0318189 A1* | 11/2017 | Asakimori | B41J 29/42 |
| 2018/0212975 A1* | 7/2018 | Bandi | G06F 16/29 |
| 2018/0278770 A1* | 9/2018 | Naitoh | H04N 1/00514 |
| 2018/0314815 A1* | 11/2018 | Bowler, II | G06F 3/0488 |
| 2018/0338057 A1* | 11/2018 | Ito | H04N 1/00209 |

* cited by examiner

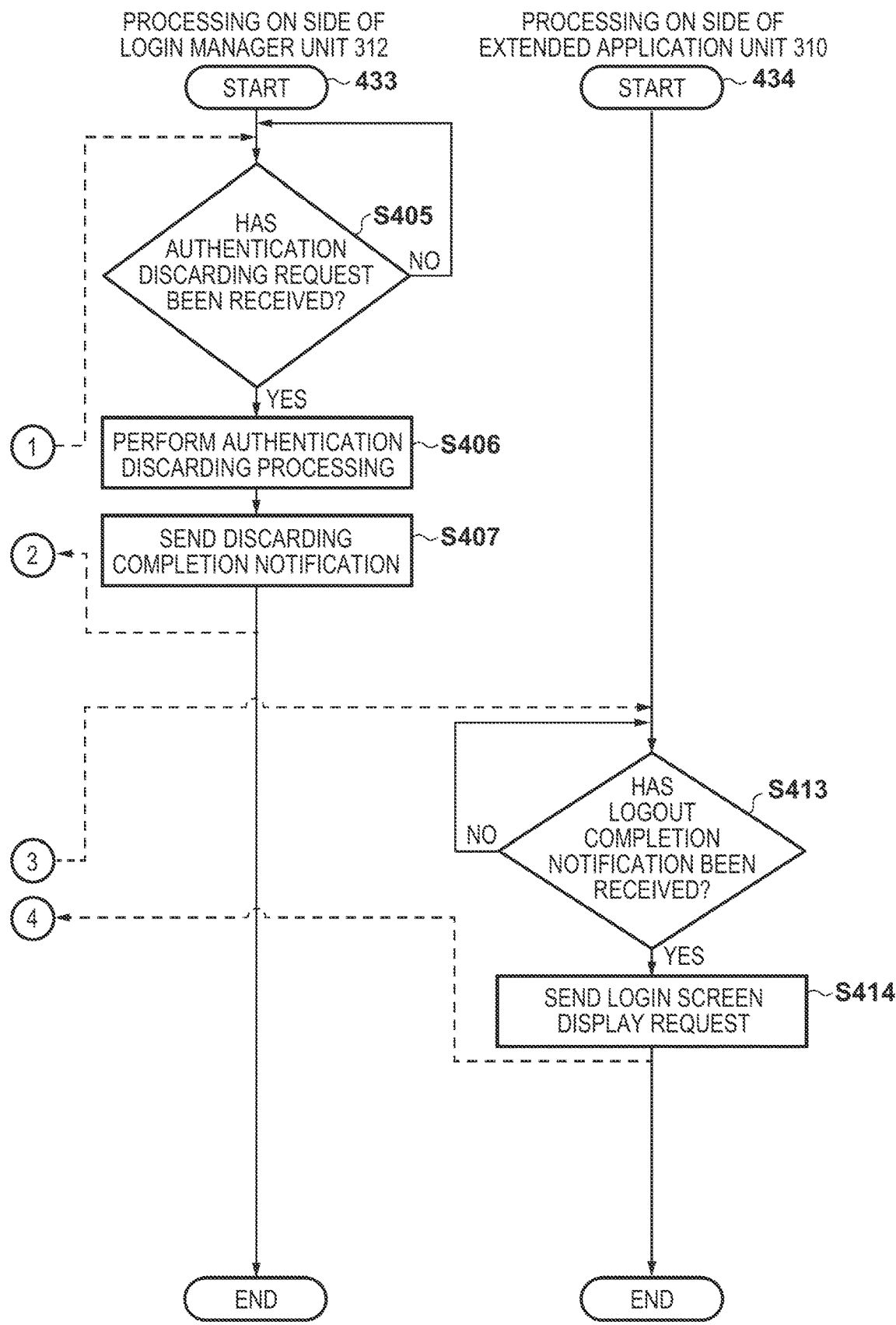

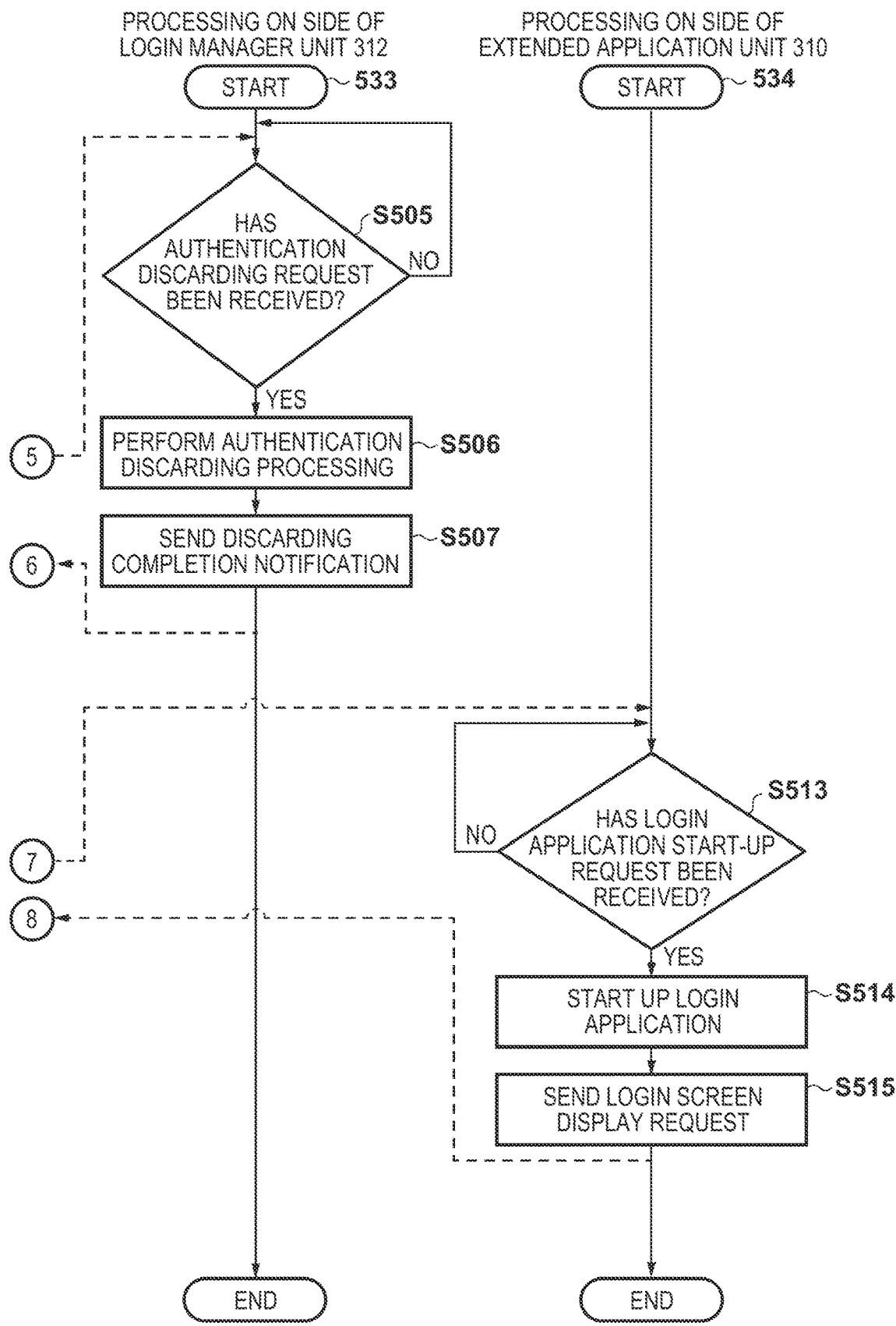

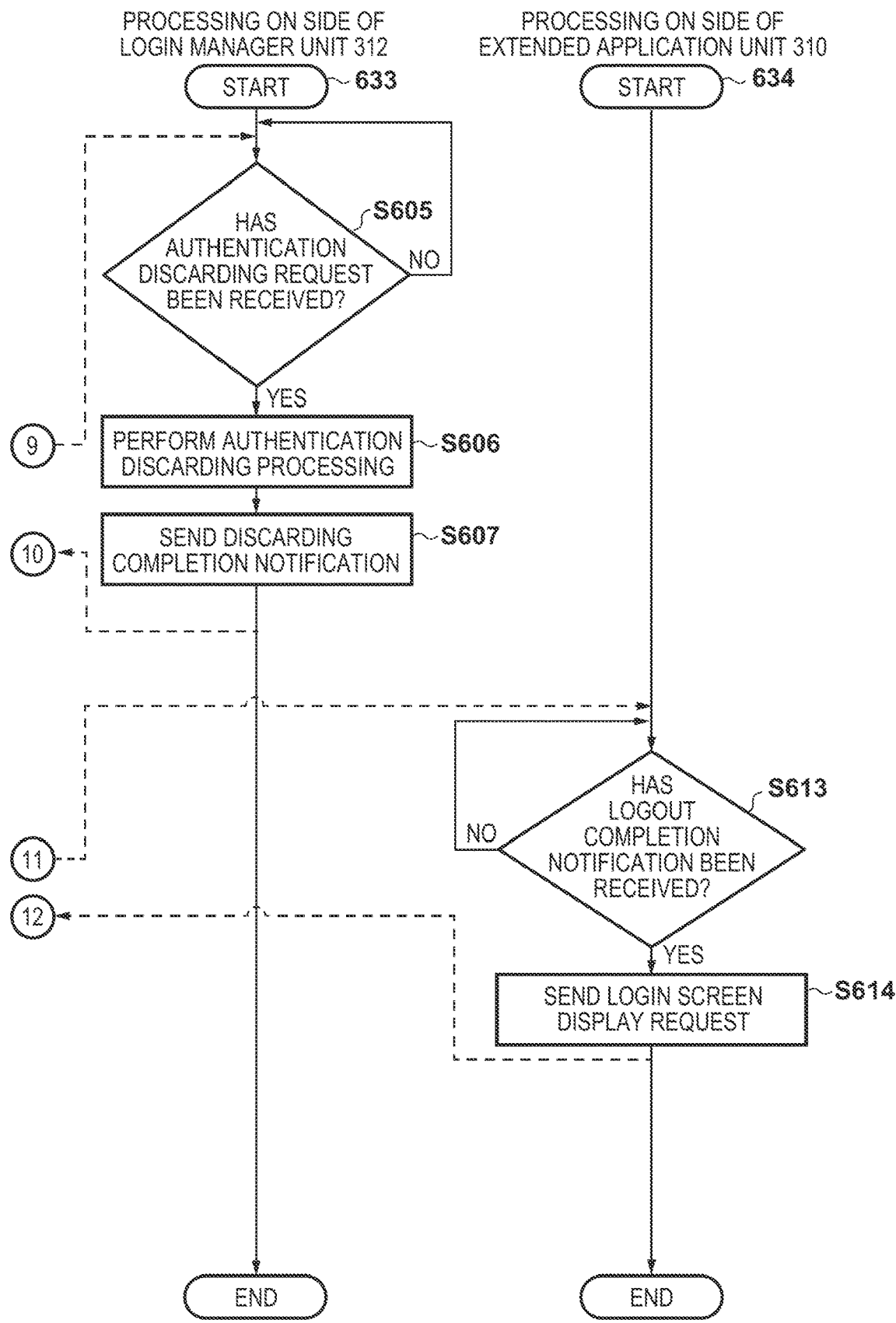

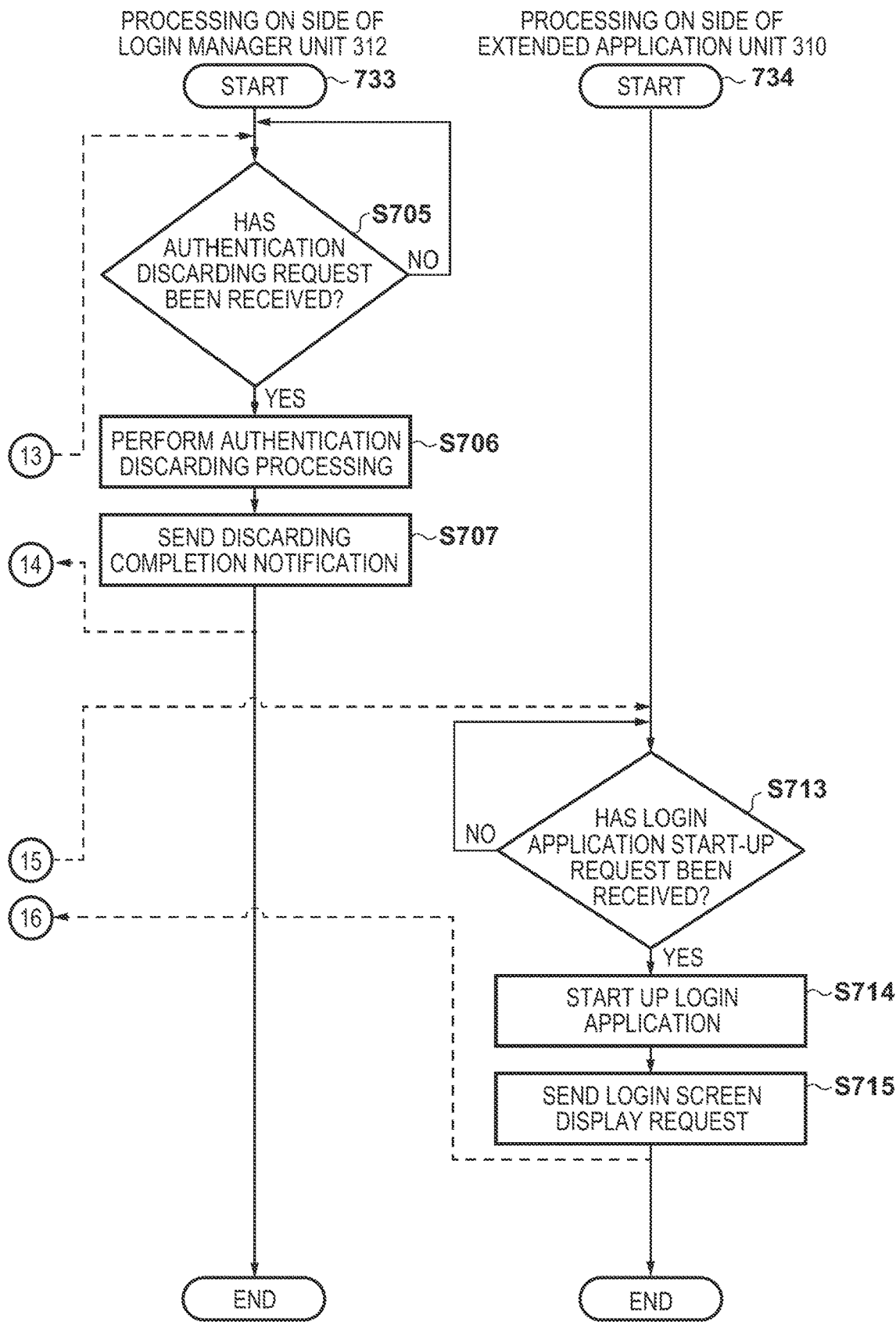

INFORMATION PROCESSING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to an information processing apparatus, a control method therefor, and a non-transitory computer-readable storage medium.

Description of the Related Art

In recent years, image forming apparatuses serving as information processing apparatuses that operate an arbitrary application on firmware are increasing. These apparatuses each have an execution environment for executing an application, and are each implemented by executing the application in the environment. Japanese Patent Laid-Open No. 2016-110511 proposes that an image prepared in advance when starting up an application is used at the time of switching between screens.

On the other hand, there is known a device login function of allowing only an authenticated user to use an image forming apparatus. An application having such login function will be referred to as a login application hereinafter. By using the device login function, it is possible to restrict a usable function for each user by login.

However, the above-described conventional technique poses a problem to be described below. When the login application uses the device login function, it may take time for the login application to display a login screen depending on the load state of the apparatus at the time of start-up of the application or logout processing. In this case, an operation screen to be originally displayed after user authentication via the login screen succeeds may be displayed during a period from when the login application is activated until the login screen is displayed. For example, if an operation of activating the login application is performed in a state in which an application that displays an operation screen has already been started up and the login application has not been started up, an operation can be performed during a period from when the activation operation is performed until the login screen is displayed.

After an activation instruction of the login application is issued, it is originally desirable to prevent the information processing apparatus from being operated before the login screen is displayed. However, in the conventional technique, during a period from when the activation instruction of the login application is issued until the login screen is displayed, the operation screen is displayed and the user can undesirably operate the operation screen without performing login processing.

If, for example, the user ends the operation during login, and performs a logout execution operation, the operation screen can be operated during a period from when the logout execution operation is performed until the login screen is displayed. After the logout execution operation is performed, it is originally desirable to restrict the operation of the information processing apparatus. In the above-described conventional technique, however, even if the user leaves there soon after performing the logout execution operation, the operation screen is displayed during a period from when the logout execution operation is performed until the login screen is displayed, and another user may operate the operation screen.

SUMMARY OF THE INVENTION

The present invention enables realization of a mechanism of preferably restricting an operation of an operation screen to prevent an unauthenticated user from operating an apparatus at the time of starting up a login application or executing logout processing.

One aspect of the present invention provides an information processing apparatus including a login application for authenticating a user, the apparatus comprising: a memory device that stores a set of instructions; and at least one processor that executes the set of instructions to: accept a start-up request of the login application; restrict input via a display unit of the information processing apparatus; start up the login application; and cancel, upon completion of the start-up of the login application, the restriction of the input via the display unit.

Another aspect of the present invention provides an information processing apparatus including a login application for authenticating a user, the apparatus comprising: a memory device that stores a set of instructions; and at least one processor that executes the set of instructions to: accept a logout request of the user who has logged in through the login application; restrict input via a display unit of the information processing apparatus; execute logout processing; and cancel, upon completion of the logout processing, the restriction of the input via the display unit.

Still another aspect of the present invention provides a control method for an information processing apparatus including a login application for authenticating a user, the method comprising: accepting a start-up request of the login application; restricting input via a display unit of the information processing apparatus; starting up the login application; and canceling, upon completion of the start-up of the login application, the restriction of the input via the display unit.

Still another aspect of the present invention provides a control method for an information processing apparatus including a login application for authenticating a user, the method comprising: accepting a logout request of the user who has logged in through the login application; restricting input via a display unit of the information processing apparatus; executing logout processing; and canceling, upon completion of the logout processing, the restriction of the input via the display unit.

Yet still another aspect of the present invention provides a non-transitory computer-readable storage medium storing a computer program for causing a computer to execute steps of a control method for an information processing apparatus including a login application for authenticating a user, the control method comprising: accepting a start-up request of the login application; restricting input via a display unit of the information processing apparatus; starting up the login application; and canceling, upon completion of the start-up of the login application, the restriction of the input via the display unit.

Still yet another aspect of the present invention provides a non-transitory computer-readable storage medium storing a computer program for causing a computer to execute steps of a control method for an information processing apparatus including a login application for authenticating a user, the control method comprising: accepting a logout request of the user who has logged in through the login application;

restricting input via a display unit of the information processing apparatus; executing logout processing; and canceling, upon completion of the logout processing, the restriction of the input via the display unit.

Further features of the present invention will become apparent from the following description of exemplary embodiments with reference to the attached drawings.

BRIEF DESCRIPTION OF THE DRAWINGS

FIGS. 4A and 4B are flowcharts illustrating a procedure of displaying a blank screen on an operation unit when a logout request is issued according to another embodiment;

FIGS. 5A and 5B are flowcharts illustrating a procedure of displaying a blank screen on the operation unit when a login application activation request is issued according to the embodiment;

FIGS. 6A and 6B are flowcharts illustrating a processing procedure of inactivating input from an operation unit when a logout request is issued according to still another embodiment;

FIGS. 7A and 7B are flowcharts illustrating a processing procedure of inactivating input from an operation unit when a login application activation instruction according to still another embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of Information Processing Apparatus>

The first embodiment of the present invention will be described below. The hardware arrangement of an image forming apparatus (MFP) as an example of an information processing apparatus according to this embodiment will be described with reference to FIG. 1.

Figure 1:
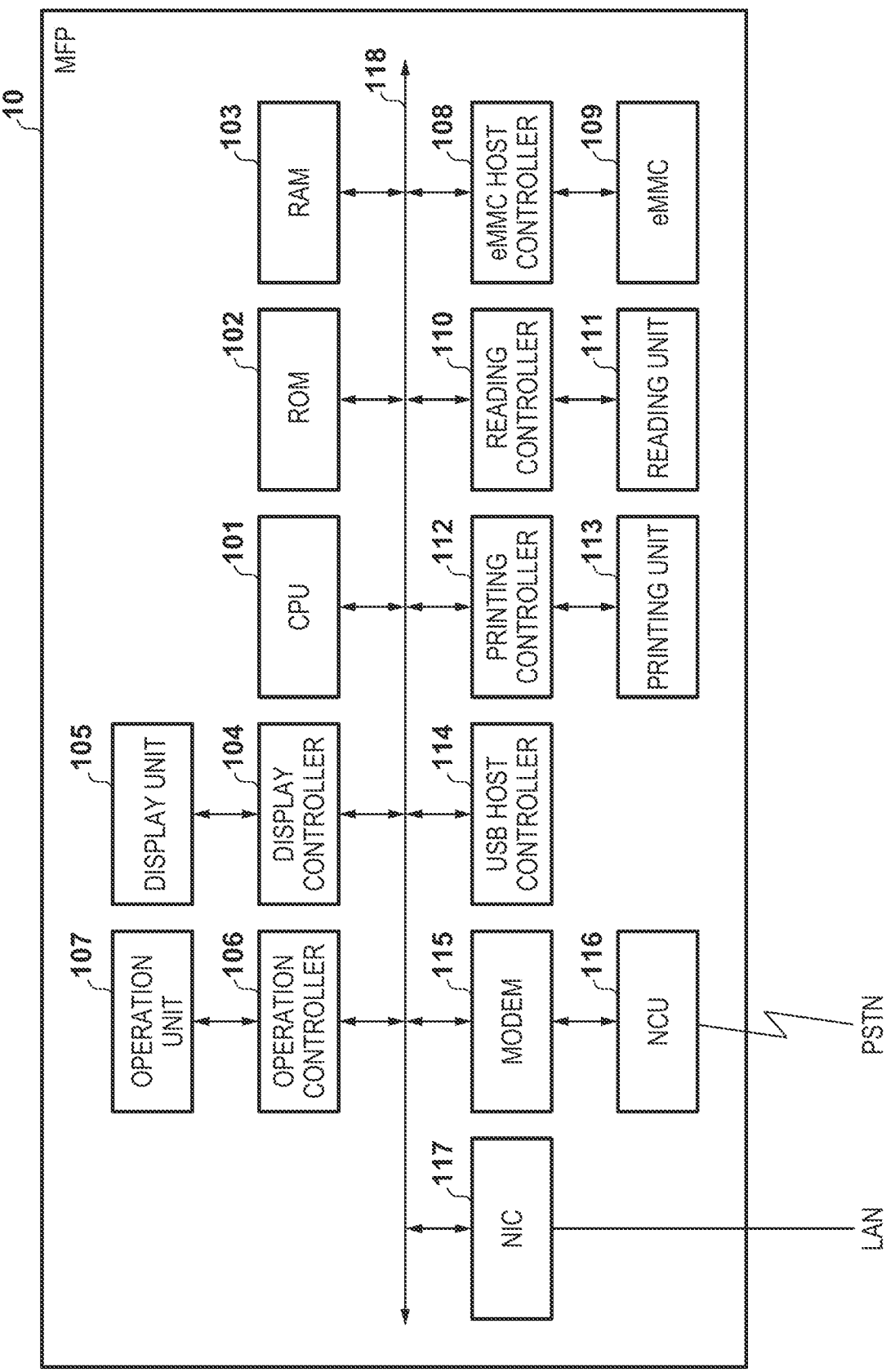
FIG. 1 is a block diagram showing the hardware arrangement of an MFP according to an embodiment.

As shown in FIG. 1, an MFP 10 includes a CPU 101, a ROM 102, a RAM 103, a display controller 104, a display unit 105, an operation controller 106, and an operation unit 107. The MFP 10 also includes an eMMC host controller 108, an eMMC 109, a reading controller 110, a reading unit 111, a printing controller 112, and a printing unit 113. In addition, the MFP 10 includes a USB host controller 114, a MODEM 115, an NCU (Network Control Unit) 116, and a NIC (Network Interface Card) 117.

The CPU 101 comprehensively controls the respective devices connected to a system bus 118. When power is supplied, the CPU 101 executes a boot program stored in the ROM 102. Normally, the boot program loads, into the RAM 103, a main program saved in a storage, and jumps to the first line of the loaded main program, thereby starting processing. The RAM 103 not only functions as a main program loading area but also functions as a main program work area and the like. The CPU 101 executes flowcharts shown in FIGS. 4A to 7B by executing control programs.

The display controller 104 controls drawing on the display unit 105. The display unit 105 is a full bitmap LCD of the WVGA size. On the other hand, the operation controller 106 controls input from the operation unit 107 provided in the MFP 10. The operation unit 107 is formed from a touch panel superimposed on the display unit 105.

The reading unit 111 reads a document. As an option, an auto document feeder (not shown) is mounted on the reading unit 111, thereby making it possible to automatically convey a plurality of documents to the reading unit 111 to read them. The reading unit 111 is connected to the reading controller 110, and the CPU 101 exchanges data with the reading unit 111 via the reading controller 110. The printing unit 113 forms an image on a printing sheet by an electrophotographic method. The printing unit 113 is connected to the printing controller 112, and the CPU 101 exchanges data with the printing unit 113 via the printing controller 112.

The USB host controller 114 performs USB protocol control, and mediates access to a USB device such as a USB memory (not shown). The MODEM 115 modulates/demodulates a signal necessary for facsimile communication. The MODEM 115 is connected to the NCU 116. The signal modulated by the MODEM 115 is sent to a PSTN (Public Switched Telephone Network) via the NCU 116. The NIC 117 bidirectionally exchanges data with an email server or a file server via a LAN.

The MFP 10 according to the embodiment includes the eMMC 109 as a storage. The CPU 101 accesses the eMMC 109 via the eMMC host controller 108.

<Operation Unit>

Figure 2:
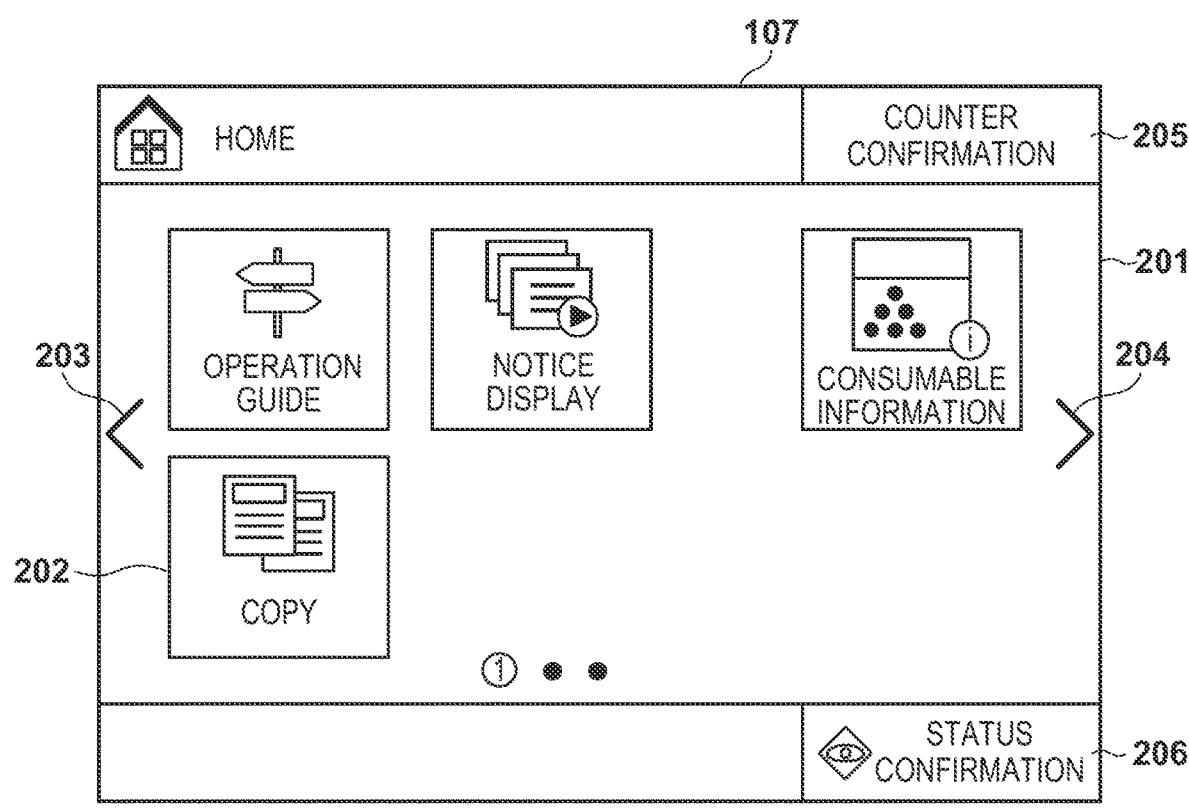
FIG. 2 is a view showing an example of the screen of the operation unit of the MFP according to the embodiment.

An example of the arrangement of the operation unit 107 of the MFP 10 will be described with reference to FIG. 2. An operation screen is displayed on the operation unit 107. On the operation screen, buttons 202 respectively representing applications are displayed in an area 201. When each button 202 is pressed, the application corresponding to the button is started up and processing registered in advance in the button is executed. In the area 201, a list of the fixed number of buttons is displayed. When a symbol 203 or 204 shown in FIG. 2 is pressed, it is possible to scroll to a display screen of a different button list. In the example shown in FIG. 2, a button of an operation guide of the MFP 10, a notice display button, a consumable information button, and a button for executing an application associated with a copy function are displayed. However, this embodiment is not intended to limit the present invention to the arrangement shown in FIG. 2.

On the operation unit 107, buttons 205 and 206 are displayed in areas different from the area 201. Upon the pressing of the button 205, the screen transits to a screen for confirming the counter of the device, for example, a history of a copy count and the like. Upon the pressing of the button 206, the screen transits to a screen for confirming a device status, for example, a processing status, a power supply status, and the like.

<Software Arrangement>

Figure 3:
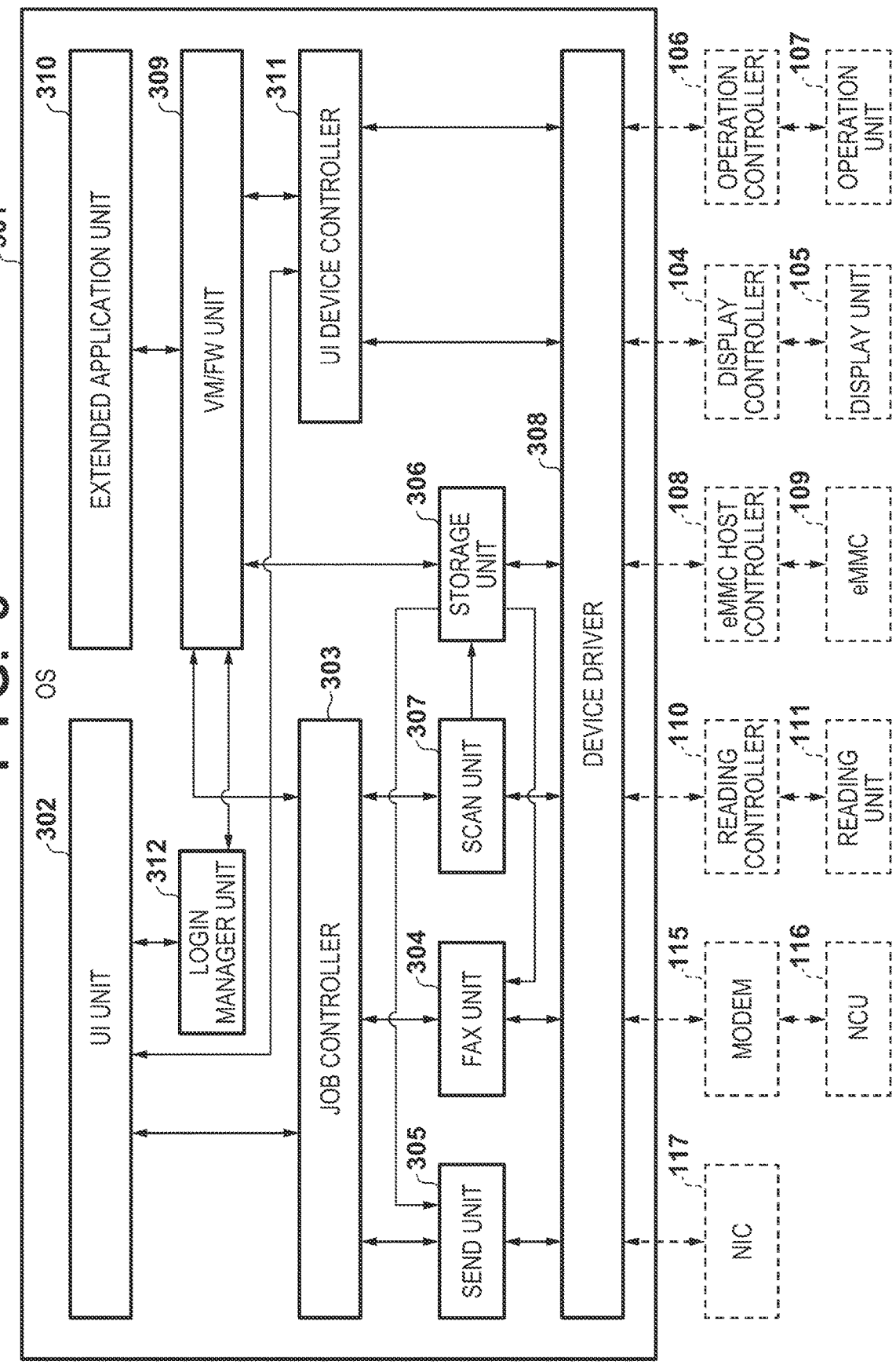
FIG. 3 is a block diagram showing the software arrangement of the MFP according to the embodiment.

The software arrangement of the MFP 10 according to this embodiment will be described with reference to FIG. 3. Each unit indicated by a solid line in FIG. 3 is a software module implemented when the CPU 101 executes the main program loaded into the RAM 103 by the above-described boot program.

As the main program, an OS (Operating System) 301 manages/controls execution of each module (to be described later). The OS 301 is combined with a device driver 308. The device driver 308 mediates exchange with hardware devices such as the display controller 104, the operation controller 106, and the reading controller 110.

A UI unit 302 provides the user with various kinds of information via the display unit 105 and the operation unit 107, and accepts various instructions from the user. A job controller 303 accepts a job such as a copy job, print job, or fax job, and controls execution of the accepted job.

A login manager unit 312 provides the UI unit 302 with a service necessary for user authentication when the user authentication function is in an activation state. If the user requests authentication (login) via the UI unit 302, the login manager unit 312 authenticates the user. If authentication succeeds, a user-specific context (authentication information) such as a user name and mail address is saved in an area managed by the login manager unit 312.

A storage unit 306 is a software module that physically stores data such as user settings and an image to be facsimile-transmitted/received in the eMMC 109 and manages them. For example, in the MFP 10 according to this embodiment, if the job controller 303 accepts a fax job, a scan unit 307 controls the reading unit 111 to scan a document in response to the job request. The scan unit 307 stores the scanned facsimile image data in the storage unit 306. The facsimile image data stored in the storage unit 306 is read out by a fax unit 304, and facsimile-transmitted to a partner destination via the MODEM 115 and the NCU 116. Alternatively, image data facsimile-received from the partner destination via the MODEM 115 and the NCU 116 is loaded by the fax unit 304 and stored in the storage unit 306.

Furthermore, the MFP 10 according to this embodiment includes a VM (Virtual Machine)/FW (FrameWork) unit 309. An extended application unit 310 is formed from an arbitrary program described in a script language, and the like. For example, a language system such as Java® or Lua as an interpreter that interprets and executes a byte code may be used. The VM/FW unit 309 has a role in installing, in the extended application unit 310, an arbitrary program described in a script language or a predetermined high level language or uninstalling an arbitrary program from the extended application unit 310. In addition, for example, the VM/FW unit 309 arbitrates between an existing function and a function implemented by the arbitrary program installed in the extended application unit 310. The VM/FW unit 309 interprets and executes the described script language. The VM/FW unit 309 transmits a message to the extended application unit 310 upon occurrence of an event related to the arbitrary program installed in the extended application unit 310. Examples of the event are key input detected on the UI unit 302 and the expiration of a timer managed by the VM/FW unit 309. If an abnormality in the arbitrary program installed in the extended application unit 310 is detected, for example, if there is no response to the message transmitted to the extended application unit 310, the VM/FW unit 309 forcibly terminates the program.

This allows the MFP 10 according to this embodiment to readily implement an arbitrary function such as a login application while maintaining the function detachability. A UI device controller 311 mediates output of various kinds of information to the display unit 105 by the UI unit 302 and the extended application unit 310 and transmission of a user operation by the operation unit 107 to the UI unit 302 and the extended application unit 310.

<Processing Procedure>

Figure 5A:
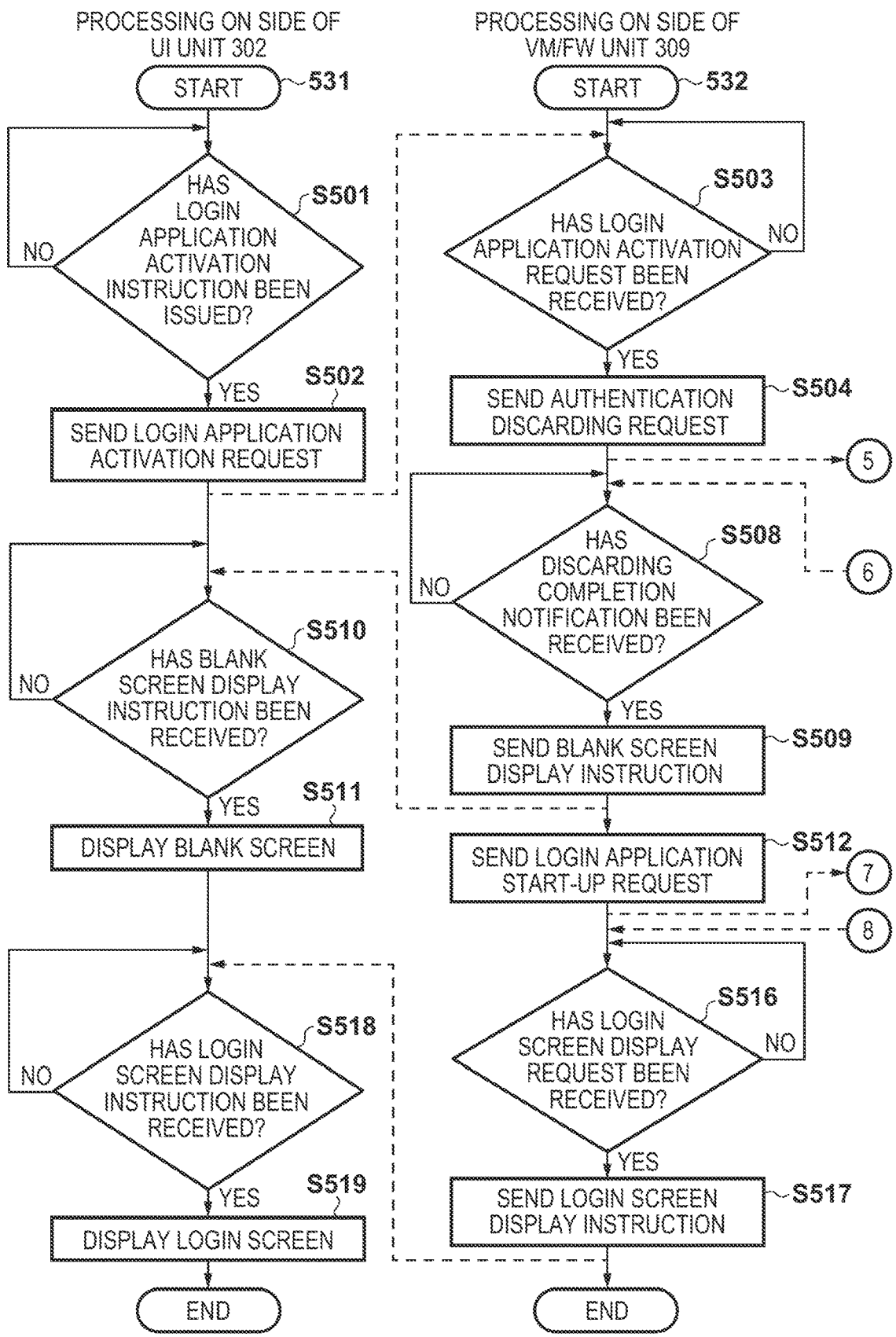

A processing procedure of displaying a blank screen on the operation unit 107 when an activation request of the login application (extended application unit 310) is issued according to this embodiment will be described with reference to FIGS. 5A and 5B. Referring to FIGS. 5A and 5B, reference numeral 531 denotes processing on the side of the UI unit 302; 532, processing on the side of the VM/FW unit 309; 533, processing on the side of the login manager unit 312; and 534, processing on the side of the extended application unit 310. Activation of the login application indicates processing of starting up the login application installed in the device. Note that processing to be described below is implemented when, for example, the CPU 101 reads out a control program stored in a storage unit such as the ROM 102 or the eMMC 109 into the RAM 103 and executes it.

In step S501, the UI unit 302 determines whether a login application activation instruction has been issued. If no login application activation instruction has been issued, the process returns to step S501 to repeat the determination processing; otherwise, the UI unit 302 sends, in step S502, a login application activation request to the VM/FW unit 309.

In step S503, the VM/FW unit 309 determines whether the login application activation request has been received. If no login application activation request has been received, the determination processing in step S503 is repeated; otherwise, the process advances to step S504. In step S504, the VM/FW unit 309 notifies the login manager unit 312 of an authentication discarding request.

In step S505, the login manager unit 312 determines whether the authentication discarding request has been received. If no authentication discarding request has been received, the determination processing in step S505 is repeated; otherwise, the login manager unit 312 performs authentication discarding processing in step S506, and sends, in step S507, a discarding completion notification to the VM/FW unit 309, thereby ending the process. The authentication discarding processing indicates processing of discarding authentication information of the user authenticated by the login application, that is, authentication information currently managed by the login manager unit 312. In step S508, the VM/FW unit 309 determines whether the discarding completion notification has been received. If no discarding completion notification has been received, the determination processing in step S508 is repeated; otherwise, the VM/FW unit 309 notifies, in step S509, the UI unit 302 of a blank screen display instruction.

Figure 8:
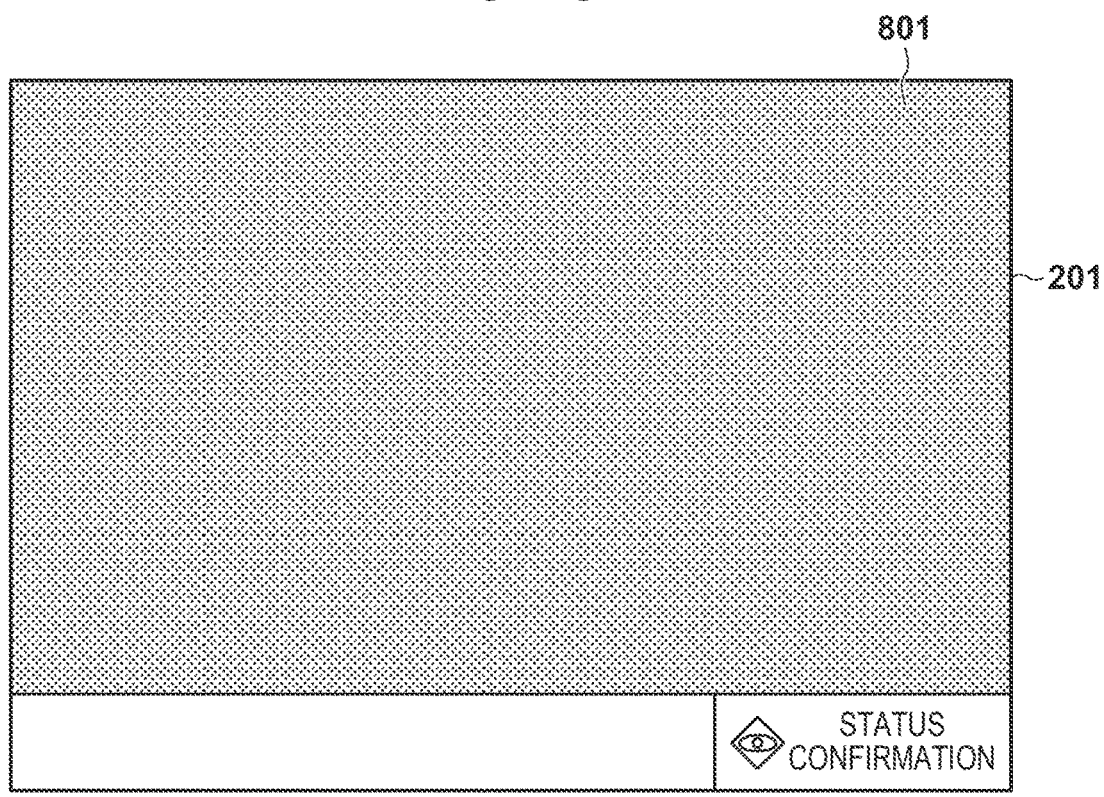
FIG. 8 is a view showing an example of an empty screen in which nothing is displayed on the operation unit according to the embodiment.

In step S510, the UI unit 302 determines whether the blank screen display instruction has been received from the VM/FW unit 309. If no blank screen display instruction has been received, the determination processing in step S510 is repeated; otherwise, a blank screen is displayed on the operation unit 107 in step S511. The processing of displaying the blank screen indicates processing of displaying an empty screen 801, in which nothing is displayed, on the screen of the operation unit 107, as shown in FIG. 8. The blank screen may be a screen that prevents a GUI (Graphical User Interface) for an operation from being displayed or a screen that prevents a GUI for an operation from being displayed by superimposing a mask image on the operation screen. The method of generating a blank image is not particularly limited. That is, by displaying the blank screen, it is possible to temporarily restrict the operation of the MFP 10. On the other hand, in step S512, the VM/FW unit 309 notifies the login application of a login application start-up request.

In step S513, the extended application unit 310 determines whether it has been notified of the login application start-up request. If the extended application unit 310 has not been notified of the login application start-up request, the determination processing in step S513 is repeated; otherwise, the extended application unit 310 starts up the login application in step S514, and notifies, in step S515, the VM/FW unit 309 of a login screen display request, thereby ending the process.

In step S516, the VM/FW unit 309 determines whether the login screen display request has been received. If no login screen display request has been received, the determination processing in step S516 is repeated; otherwise, the VM/FW unit 309 notifies, in step S517, the UI unit 302 of a login screen display instruction, thereby ending the process.

Figure 9:
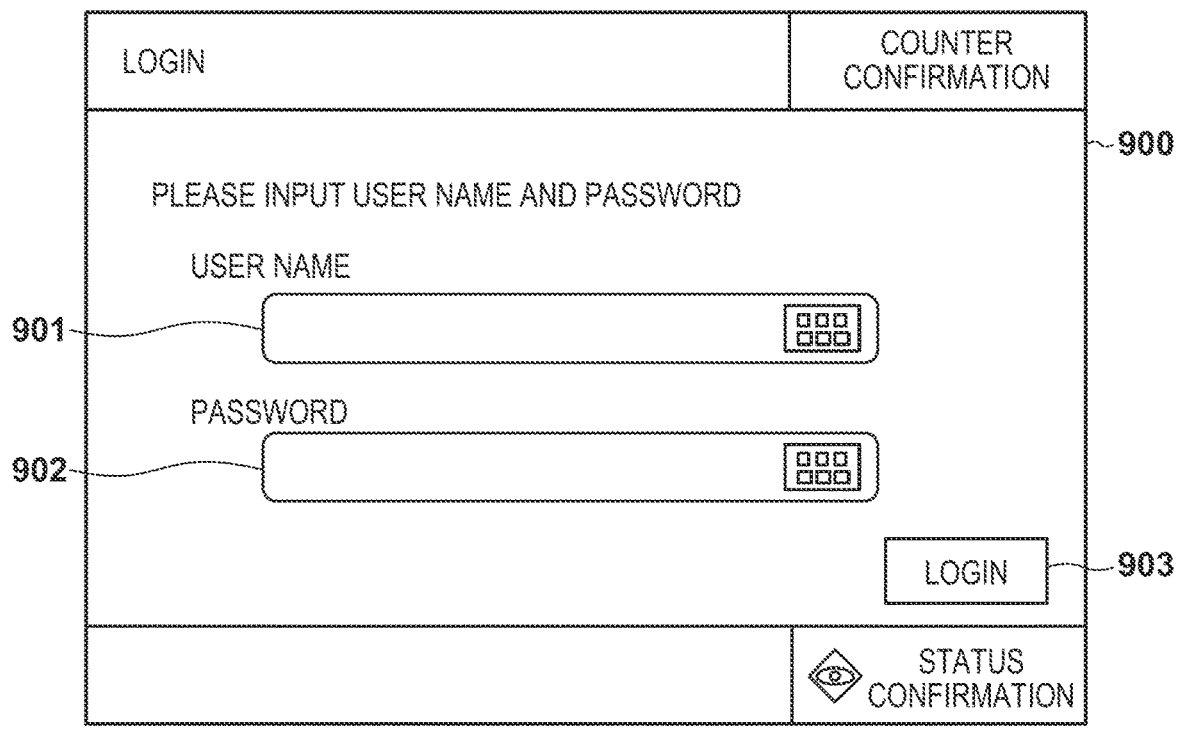
FIG. 9 is a view showing an example of a login screen according to the embodiment.

In step S518, the UI unit 302 determines whether the login screen display instruction has been received. If no login screen display instruction has been received, the determination processing in step S518 is repeated; otherwise, the UI unit 302 switches, in step S519, the display of the operation unit 107 from the blank screen to a login screen, thereby ending the process. The login screen is a screen which includes a user name input field 901 and a password input field 902, as shown in FIG. 9, and is used to perform authentication by pressing a login button 903 in a state in which a user name and a password are input. An example of performing authentication by inputting a user name and a password to the user name input field and the password input field, respectively, has been explained. The present invention, however, is not limited to this.

As described above, upon accepting the activation request (start-up request) of the login application, the information processing apparatus (MFP) according to this embodiment displays a blank screen that does not accept input to the operation unit 107 before the login application is activated (started up). After that, upon starting up the login application, the information processing apparatus displays the login screen of the login application on the operation unit 107, and accepts user input. This can prevent the information processing apparatus from being operated without authentication while the login application is started up.

Second Embodiment

Figure 4A:
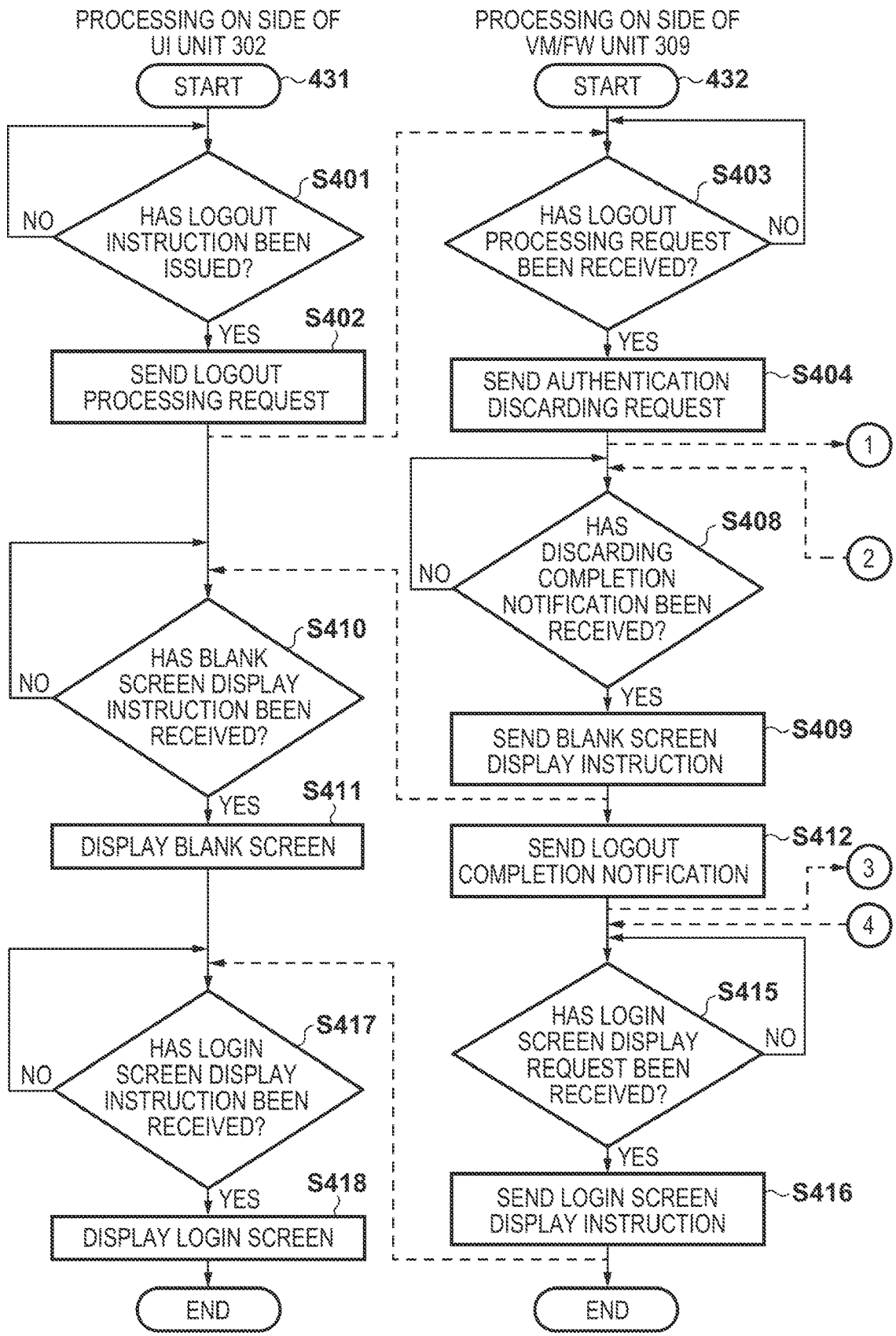

The second embodiment of the present invention will be described below. A processing procedure of displaying a blank screen on an operation unit 107 when a logout request is issued according to this embodiment will be described with reference to FIGS. 4A and 4B. Referring to FIGS. 4A and 4B, reference numeral 431 denotes processing on the side of a UI unit 302; 432, processing on the side of a VM/FW unit 309; 433, processing on the side of a login manager unit 312; and 434, processing on the login application side. Note that processing to be described below is implemented when, for example, a CPU 101 reads out a control program stored in a storage unit such as a ROM 102 or an eMMC 109 into a RAM 103 and executes it.

In step S401, the UI unit 302 determines whether a logout instruction has been issued. If no logout instruction has been issued, the determination processing in step S401 is repeated; otherwise, the UI unit 302 sends, in step S402, a logout processing request to the VM/FW unit 309.

In step S403, the VM/FW unit 309 determines whether the logout processing request has been received. If no logout processing request has been received, the determination processing in step S403 is repeated; otherwise, the VM/FW unit 309 sends, in step S404, an authentication discarding request to the login manager unit 312.

In step S405, the login manager unit 312 determines whether the authentication discarding request has been received. If no authentication discarding request has been received, the determination processing in step S405 is repeated; otherwise, the login manager unit 312 performs authentication discarding processing in step S406, and sends, in step S407, a discarding completion notification to the VM/FW unit 309, thereby ending the process.

In step S408, the VM/FW unit 309 determines whether the discarding completion notification has been received. If no discarding completion notification has been received, the determination processing in step S408 is repeated; otherwise, the VM/FW unit 309 notifies, in step S409, the UI unit 302 of a blank screen display instruction.

In step S410, the UI unit 302 determines whether it has been notified of the blank screen display instruction. If the UI unit 302 has not been notified of the blank screen display instruction, the determination processing in step S410 is repeated; otherwise, the UI unit 302 displays, in step S411, a blank screen shown in FIG. 8 on the operation unit 107. On the other hand, the VM/FW unit 309 notifies, in step S409, the UI unit 302 of the blank screen display instruction, and sends, in step S412, a logout completion notification to an extended application unit 310.

In step S413, the extended application unit 310 determines whether the logout completion notification has been received. If no logout completion notification has been received, the determination processing in step S413 is repeated; otherwise, the extended application unit 310 notifies, in step S414, the VM/FW unit 309 of a login screen display request, thereby ending the process.

In step S415, the VM/FW unit 309 determines whether the login screen display request has been received. If no login screen display request has been received, the determination processing in step S415 is repeated; otherwise, the VM/FW unit 309 notifies, in step S416, the UI unit 302 of a login screen display instruction, thereby ending the process.

In step S417, the UI unit 302 determines whether the login screen display instruction has been received. If no login screen display instruction has been received, the determination processing in step S417 is repeated; otherwise, the display is switched, in step S418, from the blank screen to a login screen shown in FIG. 9, and the UI unit 302 ends the process.

As described above, upon accepting a logout processing request, an information processing apparatus according to this embodiment displays the blank screen on the operation unit 107 before the logout processing is performed. After that, upon completion of the logout processing, the information processing apparatus displays the login screen of the login application on the operation unit 107. This can prevent the information processing apparatus from being operated without authentication during the logout processing.

Third Embodiment

Figure 6A:
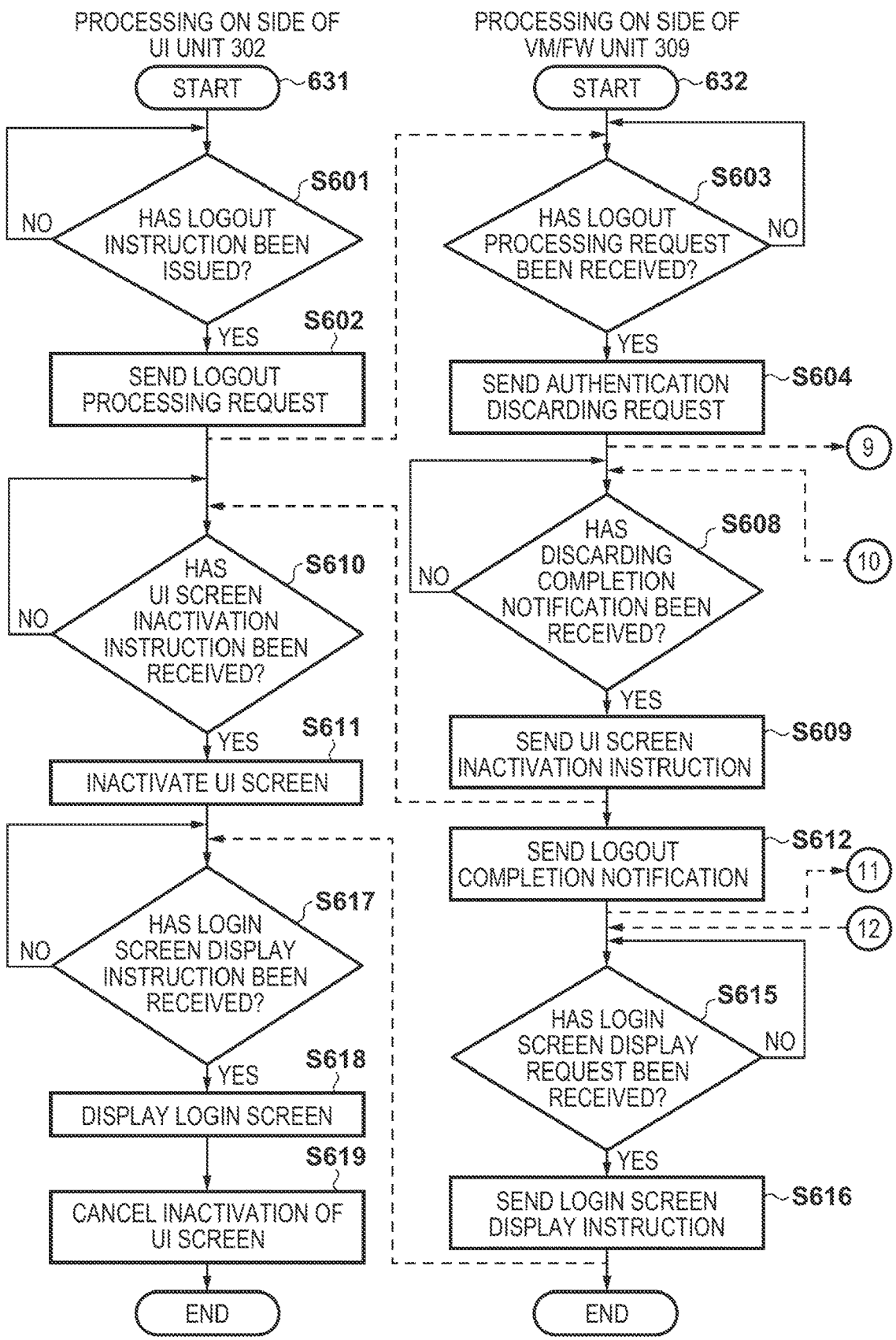

The third embodiment of the present invention will be described below. A processing procedure of inactivating input from an operation unit 107 when a logout request is issued according to this embodiment will be described with reference to FIGS. 6A and 6B. Referring to FIGS. 6A and 6B, reference numeral 631 denotes processing on the side of a UI unit 302; 632, processing on the side of a VM/FW unit 309; 633, processing on the side of a login manager unit 312; and 634, processing on the login application side. Inactivation of input from the operation unit 107 indicates processing of ignoring input information when a screen or a button in the screen is pressed on the operation unit 107 shown in FIG. 2. Note that processing to be described below is implemented when, for example, a CPU 101 reads out a control program stored in a storage unit such as a ROM 102 or an eMMC 109 into a RAM 103 and executes it. Processes in steps S601 to S608 are the same as those in steps S401 to S408 and a description thereof will be omitted.

If it is determined in step S608 that a discarding completion notification has been received, the VM/FW unit 309 notifies, in step S609, the UI unit 302 of a UI screen inactivation instruction. In step S610, the UI unit 302 determines whether the UI screen inactivation instruction has been received. If no UI screen inactivation instruction has been received, the determination processing in step S610 is repeated; otherwise, the UI unit 302 inactivates a UI screen in step S611. That is, in subsequent processing, processing of ignoring input via the UI screen is performed.

The VM/FW unit 309 notifies, in step S609, the UI unit 302 of a UI screen inactivation instruction, and sends, in step S612, a logout completion notification to an extended application unit 310. In step S613, the extended application unit 310 determines whether the logout completion notification has been received. If no logout completion notification has been received, the determination processing in step S613 is repeated; otherwise, the extended application unit 310 notifies, in step S614, the VM/FW unit 309 of a login screen display request, thereby ending the process.

In step S615, the VM/FW unit 309 determines whether the login screen display request has been received. If no login screen display request has been received, the determination processing in step S615 is repeated; otherwise, the VM/FW unit 309 notifies, in step S616, the UI unit 302 of a login screen display instruction, thereby ending the process.

In step S617, the UI unit 302 determines whether the login screen display instruction has been received. If no login screen display instruction has been received, the determination processing in step S617 is repeated; otherwise, the UI unit 302 displays a login screen in step S618, and cancels the inactivation of the UI screen in step S619, thereby ending the process. Therefore, in subsequent processing, input via the UI screen is accepted without being ignored.

As described above, upon accepting a logout processing request, an information processing apparatus according to this embodiment controls to ignore information input via the UI screen of the operation unit 107 without accepting it before the logout processing is performed. After that, upon completion of the logout processing, the information processing apparatus displays the login screen of the login application on the operation unit 107 to accept input. This can prevent the information processing apparatus from being operated without authentication during the logout processing.

Fourth Embodiment

Figure 7A:
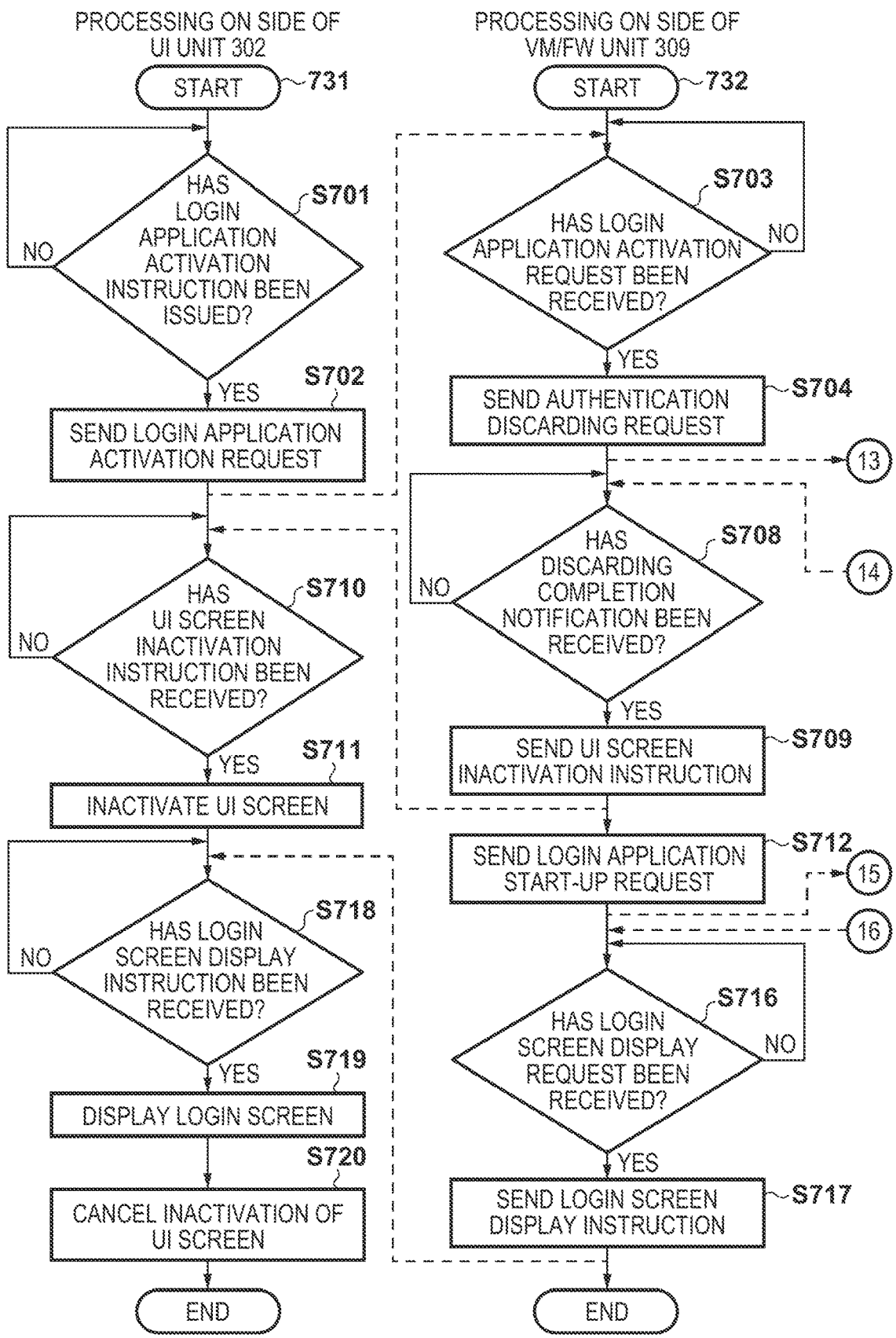

The fourth embodiment of the present invention will be described below. A processing procedure of inactivating input from an operation unit 107 when a login application activation request according to this embodiment will be described with reference to FIGS. 7A and 7B. Referring to FIGS. 7A and 7B, reference numeral 731 denotes processing on the side of a UI unit 302; 732, processing on the side of a VM/FW unit 309; 733, processing on the side of a login manager unit 312; and 734, processing on the login application side. Note that processing to be described below is implemented when, for example, a CPU 101 reads out a control program stored in a storage unit such as a ROM 102 or an eMMC 109 into a RAM 103 and executes it. Processes in steps S701 to S708 are the same as those in steps S501 to S508 and a description thereof will be omitted.

If it is determined in step S708 that a discarding completion notification has been received, the VM/FW unit 309 notifies, in step S709, the UI unit 302 of a UI screen inactivation instruction. In step S710, the UI unit 302 determines whether the UI screen inactivation instruction has been received. If no UI screen inactivation instruction has been received, the determination processing in step S710 is repeated; otherwise, a UI screen is inactivated in step S711.

The VM/FW unit 309 notifies, in step S709, the UI unit 302 of a UI screen inactivation instruction, and notifies, in step S712, an extended application unit 310 of a login application start-up request.

In step S713, the extended application unit 310 determines whether it has been notified of the login application start-up request. If the extended application unit 310 has not been notified of the login application start-up request, the determination processing in step S713 is repeated; otherwise, the extended application unit 310 starts up the login application in step S714, and notifies, in step S715, the VM/FW unit 309 of a login screen display request, thereby ending the process.

In step S716, the VM/FW unit 309 determines whether the login screen display request has been received. If no login screen display request has been received, the determination processing in step S716 is repeated; otherwise, the VM/FW unit 309 notifies, in step S717, the UI unit 302 of a login screen display instruction, thereby ending the process.

In step S718, the UI unit 302 determines whether the login screen display instruction has been received. If no login screen display instruction has been received, the determination processing in step S718 is repeated; otherwise, the UI unit 302 displays the login screen in step S719, and cancels the inactivation of the UI screen in step S720, thereby ending the process.

As described above, upon accepting a login application activation request, an information processing apparatus (MFP) according to this embodiment controls to ignore information input via the UI screen of the operation unit 107 without accepting it before the login application is activated (started up). After that, upon starting up the login application, the information processing apparatus displays the login screen of the login application on the operation unit 107, and accepts input. This can prevent the information processing apparatus from being operated without authentication while the login application is started up.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-104944 filed on May 26, 2017, which is hereby incorporated by reference herein in its entirety.

What is claimed is:

1. An image forming apparatus in which a login application operating on a framework and for authenticating a user is installed, the apparatus comprising:
   an operation unit;
   one or more memory devices that store a set of instructions; and
   one or more processors that execute the set of instructions to:
     transmit, by the framework, an activation request of the login application;
     transmit, by the framework, a display request for displaying a predetermined screen on the operation unit of the image forming apparatus when transmitting the activation request of the login application;
     activate the login application upon receiving the activation request of the login application; and
     cause the operation unit to display a login screen for receiving authentication information upon completing the activation of the login application,
     wherein the predetermined screen for restricting an operation from the operation unit is displayed on the operation unit in accordance with the display request until the login screen is displayed, and thereafter the login screen is displayed on the operation unit instead of the predetermined screen without receiving an instruction from the operation unit.

2. The image forming apparatus according to claim 1, wherein the predetermined screen is a blank screen not accepting an operation via the operation unit.

3. The image forming apparatus according to claim 1, wherein the one or more processors further execute the set of instructions to:
   manage authentication information related to the user and authenticated by the login application; and
   discard the currently managed authentication information when the predetermined screen is displayed on the operation unit.

4. The image forming apparatus according to claim 3, wherein the one or more processors further execute the set of instructions to:
   start, upon discarding of the currently managed authentication information, restriction of an operation via the operation unit.

5. The image forming apparatus according to claim 1, wherein the login screen is a screen for inputting a user name and a password.

6. The image forming apparatus according to claim 5, wherein at least a part of functions of the image forming apparatus can be used in accordance with the inputting of the user name and the password on the login screen.

7. The image forming apparatus according to claim 1, wherein an operation received via the operation unit is ignored while the predetermined screen has been displayed on the operation unit.

8. A control method for an image forming apparatus comprising an operation unit and in which a login application operating on a framework and for authenticating a user is installed, the control method comprising:
   transmitting, by the framework, an activation request of the login application;
   transmitting, by the framework, a display request for displaying a predetermined screen on the operation unit of the image forming apparatus when transmitting the activation request of the login application;
   activating the login application upon receiving the activation request of the login application; and
   causing the operation unit to display a login screen for receiving authentication information upon completing the activation of the login application,
   wherein the predetermined screen for restricting an operation from the operation unit is displayed on the operation unit in accordance with the display request until the login screen is displayed, and thereafter the login screen is displayed on the operation unit instead of the predetermined screen without receiving an instruction from the operation unit.

9. The control method according to claim 8, wherein the predetermined screen is a blank screen not accepting an operation via the operation unit.

10. The control method according to claim 8, further including:
    managing authentication information related to the user and authenticated by the login application; and
    discarding the currently managed authentication information when the predetermined screen is displayed on the operation unit.

11. The control method according to claim 10, further including:
    starting, upon discarding of the currently managed authentication information, restriction of an operation via the operation unit.

12. The control method according to claim 8, wherein the login screen is a screen for inputting a user name and a password.

13. The control method according to claim 12, wherein at least a part of functions of the image forming apparatus can be used in accordance with the inputting of the user name and the password on the login screen.

14. The control method according to claim 8, wherein an operation received via the operation unit is ignored while the predetermined screen has been displayed on the operation unit.

15. A non-transitory computer-readable storage medium storing a computer program for causing a computer to execute steps of a control method for an image forming apparatus comprising an operation unit and in which a login application operating on a framework and for authenticating a user is installed, the control method comprising:
- transmitting, by the framework, an activation request of the login application;
- transmitting, by the framework, a display request for displaying a predetermined screen on the operation unit of the image forming apparatus when transmitting the activation request of the login application;
- activating the login application upon receiving the activation request of the login application; and
- causing the operation unit to display a login screen for receiving authentication information upon completing the activation of the login application,
- wherein the predetermined screen for restricting an operation from the operation unit is displayed on the operation unit in accordance with the display request until the login screen is displayed, and thereafter the login screen is displayed on the operation unit instead of the predetermined screen without receiving an instruction from the operation unit.

* * * * *